United States Patent [19]

Shirato et al.

[11] Patent Number: 5,572,399

[45] Date of Patent: Nov. 5, 1996

[54] INFORMATION PROCESSING APPARATUS HAVING CD-ROM DEVICE

[75] Inventors: Kiyoshi Shirato, Kawanishi; Yasuji Yamato, Osaka, both of Japan

[73] Assignee: Matsushita Electric Industrial Co., Ltd., Osaka, Japan

[21] Appl. No.: 401,820

[22] Filed: Mar. 10, 1995

[30] Foreign Application Priority Data

Mar. 15, 1994 [JP] Japan ................................ 6-044300
Aug. 2, 1994 [JP] Japan ................................ 6-181278

[51] Int. Cl.$^6$ ................................ G11B 7/00; G06F 1/00
[52] U.S. Cl. .................... 361/680; 361/683; 361/685; 369/75.1; 364/708.1
[58] Field of Search .......................... 361/679, 680, 361/681, 685, 686, 684; 364/708.1; 400/682; 369/75.1, 75.2, 32, 33; G06F 1/16

[56] References Cited

U.S. PATENT DOCUMENTS

| | | |
|---|---|---|
| 4,776,284 | 10/1988 | McIntosh . |
| 4,913,387 | 4/1990 | Tice . |
| 4,960,256 | 10/1990 | Chihara et al. . |
| 5,083,290 | 1/1992 | Hosoi . |
| 5,132,876 | 7/1992 | Ma ............................. 361/680 |
| 5,176,351 | 1/1993 | Moore . |
| 5,202,844 | 4/1993 | Kamio et al. . |
| 5,247,285 | 9/1993 | Yokota et al. . |
| 5,355,357 | 10/1994 | Yamamori et al. ............ 361/680 |
| 5,363,355 | 11/1994 | Takagi ............................ 369/32 |

Primary Examiner—Leo P. Picard
Assistant Examiner—Lynn D. Feild
Attorney, Agent, or Firm—Ratner & Prestia

[57] ABSTRACT

An information processing apparatus including a body, a display moveably connected to the body, a CD-ROM device built into the body with its receptacle facing up for accommodating a medium disk, and a keyboard arrangement. The keyboard arrangement is coupled to the body so that the keyboard arrangement can be moved between two positions including a first position where the keyboard arrangement is used for processing information and a second position where the keyboard arrangement allows an operator to load or unload the medium disk directly into the CD-ROM device. The information processing apparatus eliminates the need of using a tray or caddy mechanism.

5 Claims, 3 Drawing Sheets

INFORMATION PROCESSING APPARATUS HAVING CD-ROM DEVICE

FIELD OF THE INVENTION

The present invention relates to an information processing apparatus such as a lap-top or book style information processing apparatus having a built-in display means and an information reproducing means (hereinafter called "CD-ROM device") which reproduces information from a disk-shaped recording medium (hereinafter called "medium disk").

BACKGROUND OF THE INVENTION

Recently, lap-top or book style information processing apparatuses with built-in displays have been widely used because they save space and are easy to carry. Since the popularity of this type of apparatus has grown in various fields, the volume of information processed using the information processing apparatus is sharply increasing. For the information processing apparatus, it is desired that the medium disk be loaded, unloaded, exchanged or stored promptly with ease.

FIG. 5 shows a conventional lap-top computer having a CD-ROM device (not shown). A keyboard 32 having a plurality of keys is set on top of a body 31. A display unit 3 is moveably hinged to the body 31. Loading of a floppy disk to a floppy disk drive device (not shown) in the body 31 is done by pushing the floppy disk into the body 31 through slit 7. Loading the medium disk into the CD-ROM device in the body 31 is done by pushing the tray 33 having the medium disk 5 into the body 31. Unloading of the medium disk 5 is done by performing the reverse of the steps for loading.

FIG. 6 shows another conventional apparatus. In FIG. 6, the medium disk 5 can be loaded in the built-in CD-ROM device, not shown in FIG. 6, by pushing a caddy 34 which stores the medium disk 5, into the body 31. Sometimes a medium disk must be changed to a second medium disk for processing other information. The second medium disk is stored outside the information processing apparatus. When the information processing apparatus is carried to another place, the second medium disk is also carried with the apparatus but packed in another package.

SUMMARY OF THE INVENTION

The present invention relates to an information processing apparatus comprising a body, a display moveably coupled to the body, and a CD-ROM device having a top loading face for loading a medium disk in the body, and a keyboard arrangement. The keyboard arrangement is coupled to the body so that the keyboard arrangement can be moved between a first position and a second position.

When the keyboard arrangement is in the first position the loading face of the CD-ROM device is concealed. The keyboard arrangement located in the second position exposes the loading face of the CD-ROM device.

When the keyboard arrangement is at the first position, the keyboard arrangement is used for information processing. When the keyboard arrangement is at the second position, an operator can load the medium disk directly on the CD-ROM device, or unload it from the CD-ROM device. The information processing apparatus according to this invention, therefore, needs neither a tray nor a caddy mechanism. As a result, the apparatus is simple to construct.

The present invention also relates to a clamping means fixed at the bottom of the keyboard arrangement. When the keyboard arrangement is at the first position, the clamping means applies pressure to the medium disk loaded on the CD-ROM device so that the medium disk can be driven at a high speed.

The present invention also relates to at least one storage place for a medium disk with or without a holding package provided on the surface of the body. The inconvenience of carrying a medium disk in a separate package is solved, and a quick exchange between a loaded medium disk and the stored medium disk can be performed.

DETAILED DESCRIPTION

The first exemplary embodiment

Figure 1:
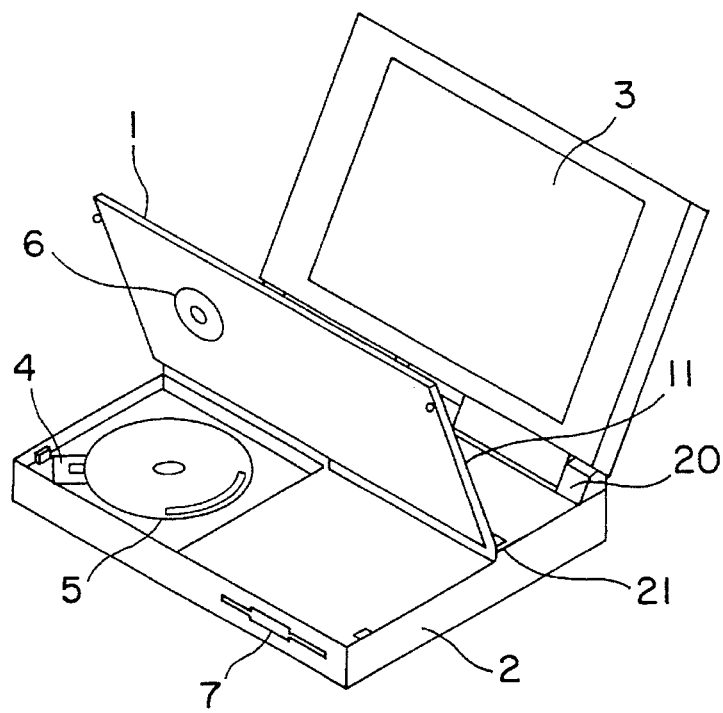
FIG. 1 is a perspective view of a first exemplary embodiment of the present invention including a keyboard arrangement 1 having a clamping means 6 which applies pressure to a medium disk 5.

FIG. 1 is a perspective view showing the first exemplary embodiment of the present invention. A display means 3 is rotatably coupled to a body 2 with hinges 20. A CD-ROM device 4 is built in the body with a loading face 8 (shown in FIG. 2) for loading a medium disk 5. A keyboard arrangement 1 having keys 11 is positioned above the body 2, and is rotatably coupled to the body 2 with the hinges 21.

Figure 2:
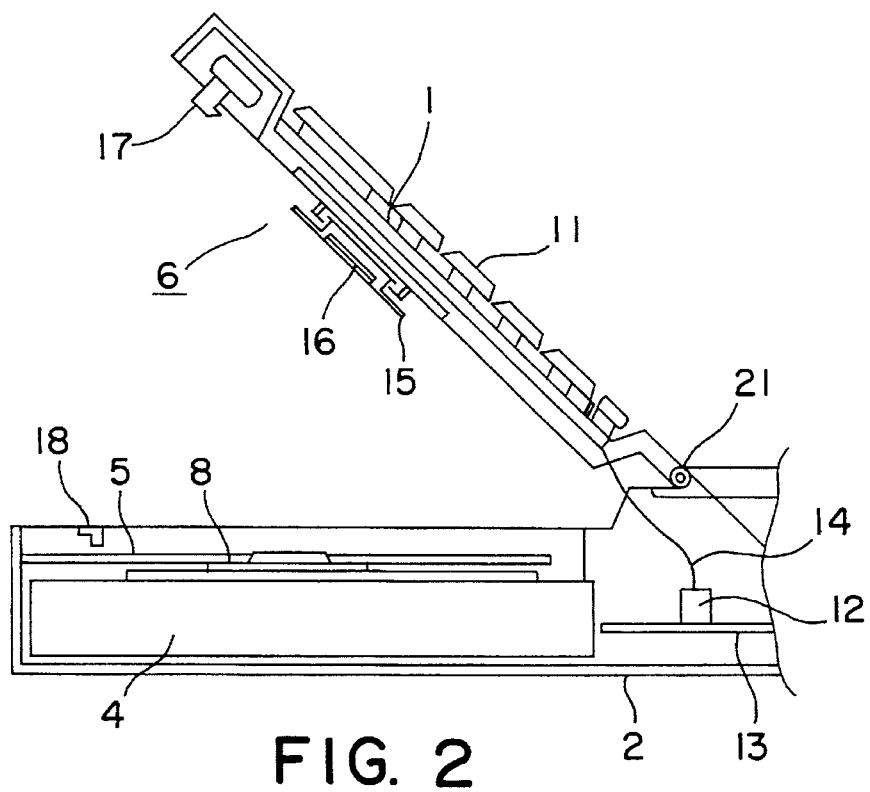
FIG. 2 is a side view of the first exemplary embodiment of the present invention.

The keyboard arrangement 1 can be moved between a first position where the keyboard arrangement conceals the loading face 8 of the CD-ROM device 4 and the second position where the keyboard arrangement exposes the loading face 8 of the CD-ROM device 4 so that the medium disk 5 can be loaded or unloaded by an operator. As shown in FIG. 2, an electric circuit of the keyboard arrangement 1 is electrically coupled to the substrate 13 in the body 2 via a flexible wired sheet 14 and a connector 12. Accordingly, the electric connection between the keyboard arrangement 1 and the body 2 is not broken by movement of the keyboard arrangement 1.

When the keyboard arrangement 1 is at the first position, a hook 17 which is biased by a spring (not shown in FIG. 1) fixes the keyboard arrangement 1 to the body 2 by hooking a stopper 18. Usually, the keyboard arrangement 1 is used for information processing in this condition. The hook 17 is released when the operator releases the stopper 18.

Initially, the keyboard arrangement 1 is at the first position concealing the loading face of the CD-ROM device. The keyboard arrangement 1 is ready for information processing at this position. A medium disk is loaded or unloaded in the following manner:

(1) The hook 17 is released, and the keyboard arrangement is moved toward the second position so that the loading face of the CD-ROM device can be exposed.

(2) The operator loads a medium disk directly onto the CD-ROM device, or unloads it from the CD-ROM device.

(3) The keyboard arrangement is restored to the first position and fixed to the body 2 with the hook 17.

On the bottom plate of the keyboard arrangement, a clamping means 6 is fixed. The clamping means 6 has a resin member 15 which holds an iron plate 16. The clamping means 6 is positioned to correspond to the center of the medium disk 5 loaded on the CD-ROM device 4. When the keyboard arrangement 1 is at the first position, the iron plate 16 of the clamping means 6 is attracted by a magnet (not shown) belonging to the CD-ROM device 4. This magnetic attraction allows the resin member 15 to apply pressure to the medium disk 5. The medium disk 5 is thus loaded in the CD-ROM device 4 so that the disk can be driven at a high speed.

When the keyboard arrangement is at the second position, the operator can load the medium disk directly onto the CD-ROM device, and unload it from the device. Accordingly, the information processing apparatus according to the present invention does not need a tray or caddy mechanism for loading or unloading the medium disk. As a result, the information processing apparatus is simple to construct, light weight, low cost, and compact in size.

Figure 3:
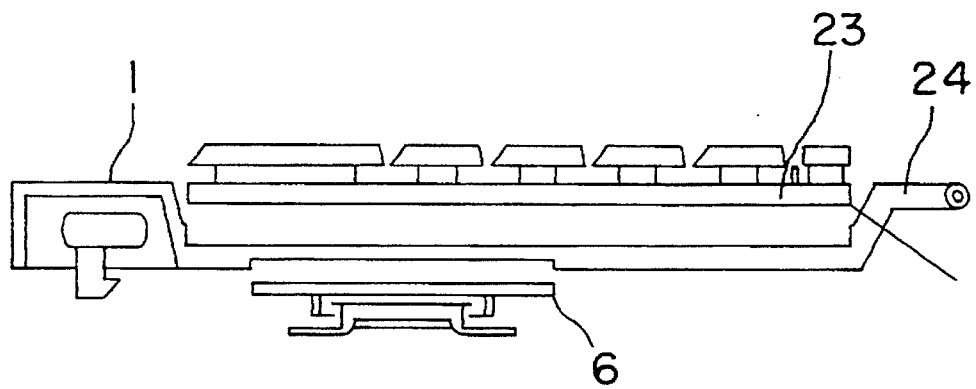
FIG. 3 shows the structure of the keyboard arrangement used in the first exemplary embodiment.

FIG. 3 shows another structure of the keyboard arrangement which comprises discrete members including a keyboard 23, a board 24, and the clamping means 6. These members are formed into one unit.

The second exemplary embodiment

Figure 4:
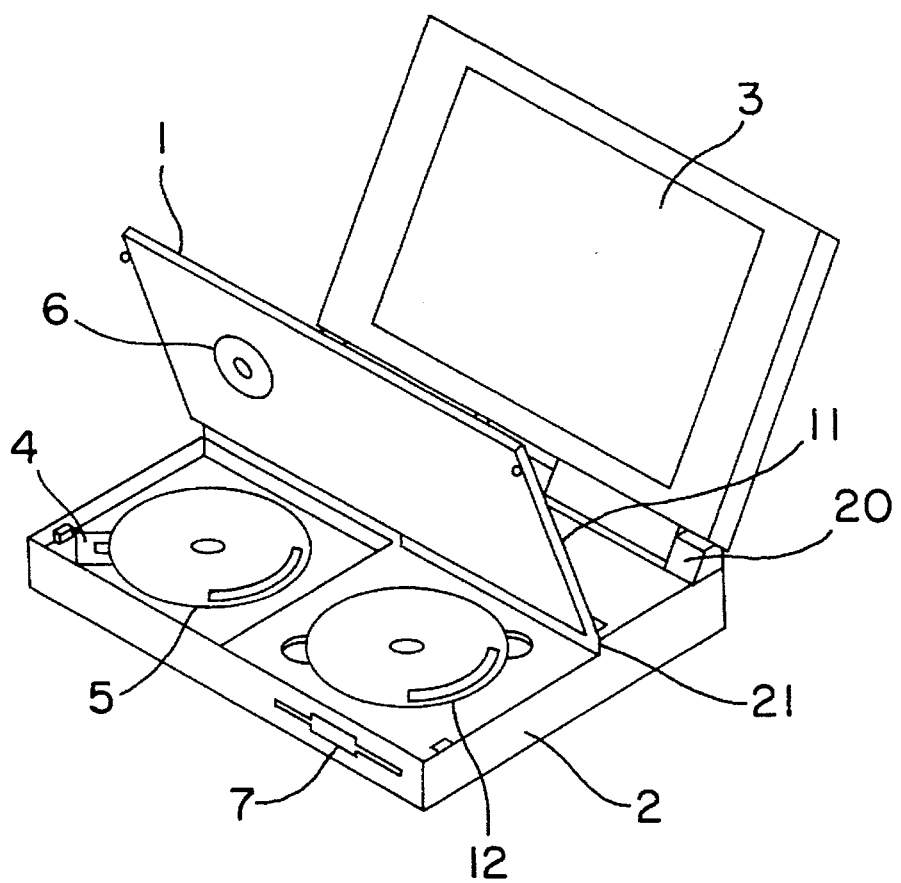
FIG. 4 is a perspective view of a second exemplary embodiment of the present invention including a storage place 12 added to the first exemplary embodiment.
Figure 5:
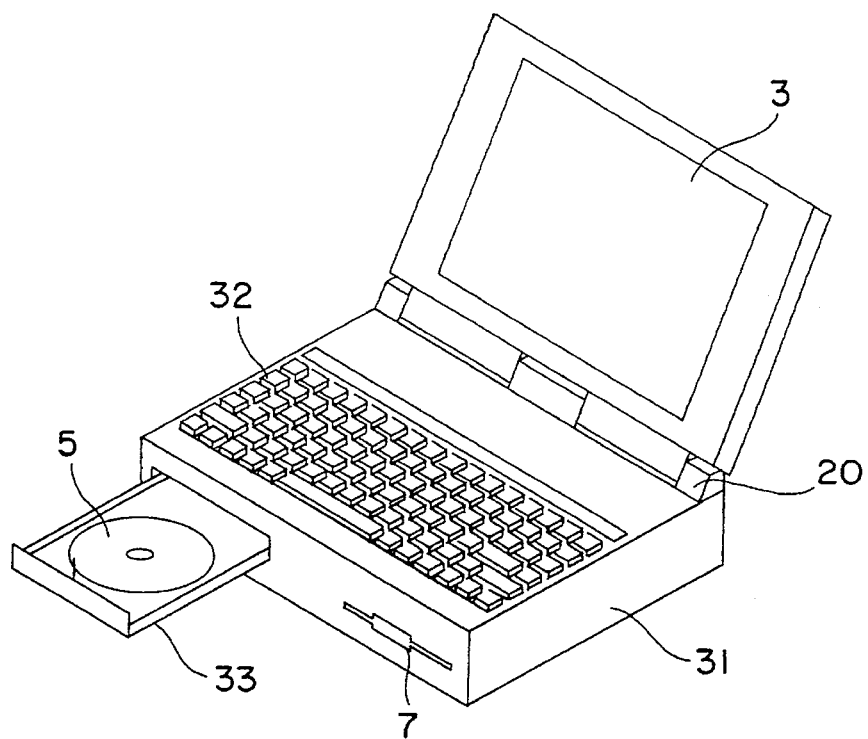
FIG. 5 shows a conventional type information processing apparatus having a CD-ROM device where the medium disk 5 is loaded in the CD-ROM device with a tray.
Figure 6:
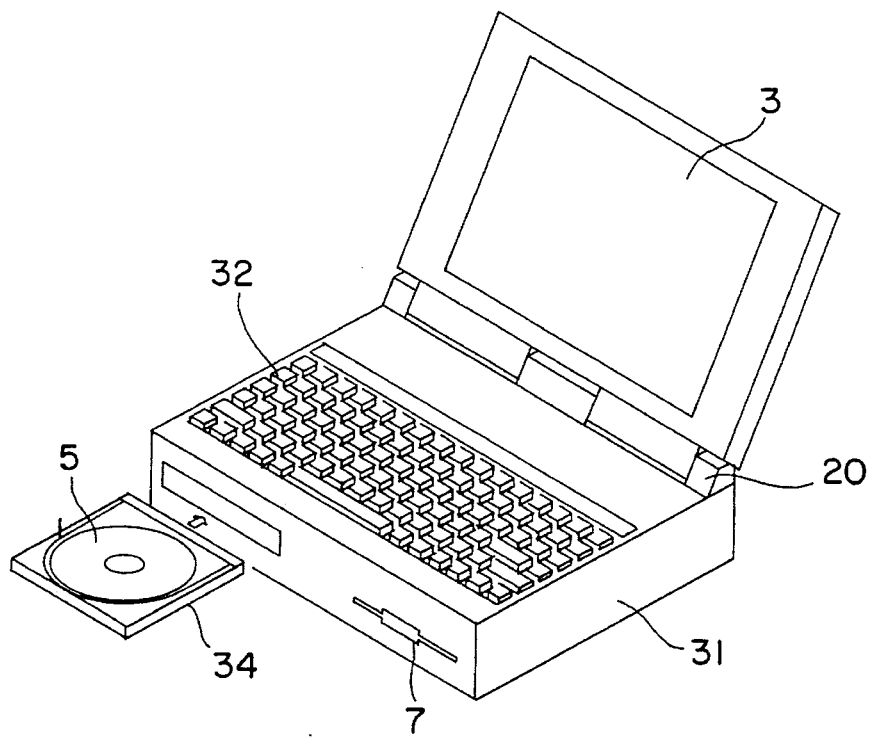
FIG. 6 shows a conventional type information processing apparatus having a CD-ROM device where the medium disk 5 is loaded in the CD-ROM device with a caddy.

FIG. 4 is a perspective view showing the second exemplary embodiment of the information processing apparatus of the present invention. On the top plate of the apparatus, at least one storage place 12 is provided for a medium disk with or without a holding package. The medium disk is stored in this storage place with its face up. At least one medium disk can be stored in one storage place. When a plurality of medium disks are stored in the one storage place, they are stacked.

The information processing apparatus according to this embodiment allows the operator to exchange a medium disk promptly with another medium disk. In addition, it solves the inconvenience of carrying medium disks in another package when the apparatus is carried to another place.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An information processing apparatus comprising:

a body haying a top face, display means moveably coupled to the body, information reproducing means, disposed in said body, reproducing information from a first medium disk, said information reproducing means having a top loading face for loading the first medium disk, keyboard arrangement, moveably coupled to the body, for entering data, said keyboard arrangement moveable between:

(1) a first position to conceal the top loading face of the information reproducing means, and (2) a second position to expose the top loading face of the intbnnation reproducing means for one of loading and unloading of the first medium disk, and at least one storage area positioned on said top face of the body at a different position from the top loading face of the information reproducing means for storing a second medium disk, said second medium disk being prevented from being reproduced at the same time as said first medium disk.

2. The information processing apparatus of claim 1, wherein said second medium disk has a disk top face, the keyboard arrangement has a bottom surface, and said second medium disk is stored in the storage area with the disk top face substantially facing the bottom surface of the keyboard arrangement when the keyboard arrangement is positioned at the first position.

3. The information processing apparatus of claim 1, wherein at least said second medium disk is stored in the storage area.

4. The information processing apparatus of claim 1, wherein the keyboard arrangement has a plurality of keys.

5. The information processing apparatus of claim 1, wherein the top loading face of the information reproducing means is substantially parallel to the top surface of the body.

* * * * *

UNITED STATES PATENT AND TRADEMARK OFFICE
CERTIFICATE OF CORRECTION

PATENT NO. : 5,572,399
DATED : November 5, 1996
INVENTOR(S) : Shirato et al.

It is certified that error appears in the above-indentified patent and that said Letters Patent is hereby corrected as shown below:

Column 4, line 10, delete "haying" and insert therefor --having--.

Column 4, line 23, delete "intbnnation" and insert therefor --information--.

Signed and Sealed this

First Day of April, 1997

Attest:

Attesting Officer

BRUCE LEHMAN
Commissioner of Patents and Trademarks